United States Patent [19]
Scott

[11] Patent Number: 6,083,270
[45] Date of Patent: Jul. 4, 2000

[54] DEVICES AND METHODS FOR INTERFACING HUMAN USERS WITH ELECTRONIC DEVICES

[75] Inventor: Neil G. Scott, Half Moon Bay, Calif.

[73] Assignee: The Board of Trustees of the Leland Stanford Junior University, Stanford, Calif.

[21] Appl. No.: 09/107,807

[22] Filed: Jun. 30, 1998

Related U.S. Application Data

[63] Continuation-in-part of application No. 08/409,409, Mar. 24, 1995, abandoned.

[51] Int. Cl.[7] .................................................. G06F 9/455
[52] U.S. Cl. ........................... 703/24; 703/26; 703/27; 703/13; 710/72; 710/73; 345/326
[58] Field of Search .................................. 395/500, 200, 395/800; 345/326; 379/88; 703/24, 25, 26, 27, 13; 710/72, 73

[56] References Cited

U.S. PATENT DOCUMENTS

| | | | |
|---|---|---|---|
| 4,485,439 | 11/1984 | Rothstein | 395/500 |
| 4,807,282 | 2/1989 | Kazan et al. | 379/284 |
| 5,008,879 | 4/1991 | Fischer et al. | 370/85.2 |
| 5,065,360 | 11/1991 | Kelly | 708/142 |
| 5,210,689 | 5/1993 | Baker et al. | 364/419 |
| 5,224,098 | 6/1993 | Bird et al. | 395/800 |
| 5,239,662 | 8/1993 | Danielson et al. | 395/285 |
| 5,245,558 | 9/1993 | Hachey | 364/708.1 |
| 5,291,489 | 3/1994 | Morgan et al. | 395/600 |
| 5,371,736 | 12/1994 | Evan | 370/79 |
| 5,406,557 | 4/1995 | Baudoin | 395/200.18 |
| 5,408,607 | 4/1995 | Nishikawa et al. | 395/200.18 |
| 5,425,028 | 6/1995 | Britton et al. | 395/800 |
| 5,442,376 | 8/1995 | Tannenbaum et al. | 345/156 |
| 5,452,420 | 9/1995 | Engdahl et al. | 395/309 |
| 5,452,433 | 9/1995 | Nihart et al. | 395/500 |
| 5,490,252 | 2/1996 | Macera et al. | 395/200.01 |
| 5,490,275 | 2/1996 | Sandvos et al. | 395/500 |
| 5,502,839 | 3/1996 | Kolnick | 395/500 |
| 5,513,320 | 4/1996 | Young et al. | 395/200.08 |
| 5,517,669 | 5/1996 | Ohkura et al. | 395/200.08 |

(List continued on next page.)

OTHER PUBLICATIONS

C. Britell, et al, Computer Adaptive Systems and Technology for the Disabled, Chapter 26 of Principles and Practices of Rehabilitation Medicine, second edition, edited by J. A. DeLisa, J. D. Lippincott Company, 1993, pp. 555–562.
N. Scott, A Total Access System for Disabled Computer Users, The Total Access System, Aug. 1992, pp. 1–6.
N. Scott, Universal Speech Access, Presentation for Speech Tech '92, New York, Feb. 1992, p. 6.

(List continued on next page.)

*Primary Examiner*—Kevin J. Teska
*Assistant Examiner*—Samuel Broda
*Attorney, Agent, or Firm*—Antonelli, Terry, Stout & Kraus, LLP

[57] ABSTRACT

A method of interfacing human users with electronic devices liberates electronic devices from specific input and output devices and substitutes a universal communication system between them. The method combines the advantages of personal customization with the advantages of unlimited access to electronic devices. In particular, it provides disabled individuals with full access to suitably equipped electronic devices such as ATMs, telephones, fax machines, computers, copiers, TVs, VCRs, stereos, and microwave ovens. This method therefore provides the means for making these important electronic devices equally accessible to everyone. In a preferred embodiment, the communication system includes a speech synthesis and recognition system [56] which is connected to an accessor total access port [54], an ATM [70] connected to a target total access port [68], and a total access link [66] between the accessor total access port [54] and the target total access port [68]. The total access link [66] is an information link over which universal data packets are transmitted between the total access ports. The universal data packets have a device-independent form and contain user-functional representations of data. A dialog initiated by the accessor total access port [54] helps the user locate the ATM [70] and establish a total access link.

16 Claims, 7 Drawing Sheets

U.S. PATENT DOCUMENTS

| | | | |
|---|---|---|---|
| 5,521,910 | 5/1996 | Matthews | 370/54 |
| 5,608,874 | 3/1997 | Ogawa et al. | 395/200.15 |
| 5,657,461 | 8/1997 | Harkins et al. | 395/333 |
| 5,675,831 | 10/1997 | Caputo | 395/830 |
| 5,689,642 | 11/1997 | Harkins et al. | 395/200.4 |
| 5,694,546 | 12/1997 | Reisman | 395/200.9 |
| 5,748,177 | 5/1998 | Baker et al. | 345/133 |
| 5,760,768 | 6/1998 | Gram | 345/333 |

OTHER PUBLICATIONS

N. Scott, The Universal System, A Development Project at CSUN supported in part by The Comprehensive Program Fund for the Improvement of Postsecondary Education, 1990, pp. 1–10.

Appendix B: The Universal Access System, CSUN/ETS Proposal to FIPSE, Oct. 1991, pp. B–1–B–3.

Linington, Peter, "File Transfer Protocols" *IEEE* Sep. 1989.

Andersen et al., "UCX–A Universal Communication Switch Experiment" *IEEE* 1988.

Siochi et al, "Computer Analysis of User Interfaces Based on Repetition in Transcripts of User Sessions," ACM Transactions on Information Systems, vol. 9, No. 4, pp. 309–335, 1991.

"CS547 Human Computer Interaction Seminar," http:// pcd.stanford.edu/pcd–archives/pcd–seminar/1992–1993/0017.html.

"What is the history of the Archimedes Project?" http://www–csli.stanford.edu/arch/FAQ/node9.html, 1996.

Scott, "The Universal Access System and Disabled Computer Users", Proceedings of the RESNA 14th Annual Conference, vol. 11 pp. 64–65, 1991.

"Personal Computer Keyboard Port Multi–Device Adapter", IBM Technical Disclosure Bulletin vol. 33 No. 6A, pp. 204–205, Nov. 1990.

Scott et al, "Kickoff Meeting, 1995 CSUN Conference", http://tracecenter.org/docs/irmtg_csun95/irmtg1.htm, 1995.

DEVICES AND METHODS FOR INTERFACING HUMAN USERS WITH ELECTRONIC DEVICES

This application is a continuation-in-part of copending U.S. patent application Ser. No. 08/409,409 filed Mar. 24, 1995, now abandoned, which is incorporated herein by reference.

FIELD OF THE INVENTION

This invention relates generally to methods and devices for interfacing human users with electronic devices. More specifically, it relates to techniques for communication between common electronic devices and human user input and output devices, including specialized or customized devices commonly used by users who have disabilities.

BACKGROUND OF THE INVENTION

As electronic devices are becoming increasingly prevalent in the world, the use of such devices is becoming increasingly necessary for the normal performance of our major life activities of working, learning, and generally enhancing the quality of life. Yet, although these electronic devices are easily accessible to most people, they are partially or entirely inaccessible to certain individuals with disabilities, whose normal performance of major life activities is thereby substantially limited.

The root of this disparity in access to electronic devices lies in the fact that people use various individualized and specialized modes of communication, while electronic devices are normally designed to interface with humans via one or two fixed modes. It has become customary to design all electronic devices to use standard input and output devices to communicate with people because most people have normal visual, motor, and auditory abilities that enable them to use these standard devices. The electronic devices, however, then become inaccessible to many people who temporarily or permanently lack these normal abilities. For example, the typical human communicates with a computer via a display screen, a keyboard and a mouse. Consequently, most computers are partly or completely inaccessible to any human with a visual or motor disability. The same limitations apply to most other electronic devices which are designed with particular input and output devices built into the same physical encasing. Such is the case, for example, with microwave ovens, automatic teller machines, telephones, fax machines, and vending machines. The input devices (usually including an arrangement of keys) and output devices (usually including a simple visual display and/or auditory tones) in these cases are normally fixed for the life of the device. This immediately limits their accessibility to those people having the corresponding motor and visual skills.

Numerous other problems arise because of these design limitations. For example, most people, when they find it necessary or desirable to switch from one computer to another, usually can adapt easily to a new input device, such as a different keyboard. For an individual with a disability, however, such a change can involve great inconvenience and may even be practically impossible. Consider, for example, a girl who is unable to operate a conventional keyboard She may have an obvious disability due to paralysis or amputation, or some less obvious condition such as multiple sclerosis, ALS, carpal tunnel, or tendonitis. One way for her to communicate with her personal computer is through a custom-designed headband which permits her to send signals similar to Morse code to her computer using muscle contractions in her forehead. The computer and its software are custom modified to convert these coded signals into certain keystrokes. This personal input device, however, must be designed to operate in accordance with the particular hardware specifications of her computer. As a result, switching to a different computer would involve disconnecting the personal input device from her computer and connecting it to the other computer. If the other computer is not the same model, this may involve redesigning the personal input device hardware to conform to the different hardware specifications of the other computer. In addition, the operation of her headband requires customized computer software that decodes the Morse code signals, and this software must also be adapted to the other computer. Clearly, the prospect of switching computers would be inconvenient for her, if not practically impossible, and the girl would be limited to using just one computer which is specially equipped for her.

Similar difficulties arise with individuals having other types of disabilities and, consequently, with other types of personal input and output devices. For example, instead of the headband, the girl of the above example could use an eye tracker or speech recognition system for input. Such a system also involves custom designed hardware and software for use with a particular computer system. Again, switching computers would be inconvenient or impractical.

Although the special headband enables the girl in the above example to gain access to her home computer, all the other electronic devices in her home such as telephones, fax machines, and microwave ovens present accessibility problems to her as well. To gain access to all these devices, it would be necessary to custom-design special hardware and software interfaces for each device; needless to say, this would be an expensive endeavor. Even if an elaborate effort were made to customize these devices for her use, whenever she purchased a new phone, TV, stereo, or microwave oven, she would have the additional expense of customizing it. More limiting, however, is the fact that this solution does not give her access to any electronic devices outside of her own home. In short, the traditional solution of customizing private devices to understand individual input and output devices does not solve the central problem of accessibility since it is expensive, inconvenient and does not allow access to public devices.

In addition to limiting the personal freedom of many individuals with disabilities, the restricted accessibility of many electronic devices can have detrimental effects on anyone who uses them. For example, individuals whose work involves long hours of computer data entry via keyboard often develop carpal-tunnel syndrome which thereafter limits their ability to type. A person previously able to access a computer through a keyboard then becomes a person disabled from doing so. In other words, computers that are limited to keyboard input become inaccessible to the very people who need to use them the most. Similar problems arise in relation to pointing devices and video displays. Thus, limitations to the input and output devices associated with electronic devices inevitably and inadvertently limit the accessibility of those very devices, and consequently limit the freedom of the individuals who use them.

One obvious way to make electronic devices accessible via many different modes of communication is to build the devices with all possible input and output interfaces. This solution, however, is economically unfeasible. Moreover, it is practically impossible to provide every electronic device with an entire array of various specialized input and output devices to accommodate every possible human access preference or need. On the other hand, it is equally impractical to customize every device an individual may need to use as the need arises. Accordingly, there is a widespread and longstanding need for devices and methods to address these important issues of human accessibility to electronic devices.

SUMMARY OF THE INVENTION

Clearly, the bondage of electronic devices to fixed input and output devices will only increase the problems of accessibility as these electronic devices become even more important and pervasive in our culture. It is therefore a primary object of this invention to provide a method communication between customized human user interface devices and electronic devices that does not require customization each time a person uses a different device, and does not require devices to be equipped with all possible user interface devices. The present invention overcomes the problems associated with providing equal access to electronic devices by liberating electronic devices entirely from dependency upon specific input and output requirements and thereby permitting any electronic device to be accessible to anyone. The invention achieves these and other objects by providing a method for communication between human interface devices and target electronic devices that is independent of the specific input and output codes and formats of the devices, thereby clearly separating user access requirements from the electronic device hardware and software.

The advantages of this method of communication are profound and far-reaching. Individuals with disabilities will be able to switch from computer to computer just as easily as individuals with normal abilities. In particular, there is no need for redesigning or customizing the hardware or software of the electronic device in order to make it accessible to the specific user interface needs of an individual. Using the method of the present invention, disabled individuals will have total access to electronic devices such as ATMs, telephones, fax machines, elevators, copiers, and vending machines. This method therefore provides the means for making these important electronic devices equally accessible to everyone. It also provides an efficient and economical way for employers to comply with the Americans with Disabilities Act which requires them to provide reasonable accommodations to individuals with disabilities. Disabled employees can receive customized user interface equipment and training independent of the employment situation. For their work, however, they can use the same hardware, software, and training as any other employee.

This method of communication will also provide new flexibility and freedom to individuals without disabilities because the mode of communication used to access a device can be changed easily without inconvenient and expensive changes to the electronic devices themselves. For example, a keyboard input device can be interchanged with a speech recognition input device without any change whatsoever to the computer with which they are used to communicate. This flexibility allows a user to quickly and easily change his or her method of communication with the same electronic device. By eliminating the prolonged repetition of restricted manual movements, the invention helps to prevent carpal-tunnel syndrome and other physical ailments.

This method of communication also has the great advantage that special input and output devices can be customized to suit the needs and preferences of a particular individual without at the same time limiting the accessibility of the electronic devices with which the individual may wish to communicate. For example, a personalized speech recognition device can function with higher efficiency and convenience than a much more complicated device designed to accommodate any possible person, regardless of vocabulary, dialect, or language. Yet such an input device, when combined with this method of communication between electronic devices, will not thereby restrict the accessibility of the device to others since the method for accessing the devices has been separated from the devices themselves The advantages of personal customization, therefore, can be combined with the advantages of unlimited access to electronic devices.

The above objects and advantages are accomplished by an approach that decouples electronic devices from specific input and output devices and inserts a universal communication link between them. In one aspect of the invention, a system is provided that includes a collection of N human user interface devices ("accessor devices") $A_1, \ldots, A_N$, which may be customized for interfacing with a particular human who has specialized access needs or preferences. In the prior art such accessor devices are connected directly to one or more electronic devices ("target devices") $B_1, \ldots, B_M$ that are customized for communication with the accessor devices. According to the teaching of the present invention, on the other hand, the accessor devices are instead connected to a first total access port A. Moreover, the collection of M electronic devices $B_1, \ldots, B_M$ are connected to a second total access port B. Total access ports A and B convert data between a device-dependent form and a device-independent form. A total access link between total access port A and total access port B is an information link over which data in the device-independent form is transmitted between the total access ports. The total access link may be implemented as an infrared link, an electronic cable link, a fiber optic link, a radio link, a computer network or any other well known information link. Because the data transmitted over the total access link has a device-independent form, i.e. it does not contain codes or formats that are limited to the hardware codes or formats used by devices $A_1, \ldots, A_N$, or by devices $B_1, \ldots, B_M$, the target devices are not limited to any particular accessor device, and the accessor devices are not limited to any particular target devices. Instead of representing information in terms of device-dependent hardware codes, the data transmitted between the total access ports represents information in a user-functional form, i.e. it directly represents the interaction of the human user with the input or output device. This user-functional representation is device-independent in the sense that it is not dependent on any particular hardware device codes. Insofar as the user interacts in a different manner with different devices, the user-functional representation may change. Such changes, however, are not device-dependent in the sense of depending on fixed codes internal to the device.

In another aspect of the invention, a method of communication between human user interface devices ("accessor devices") and electronic devices ("target devices") involves receiving at the N accessor devices $A_1, \ldots, A_N$ input from a human user, sending from the N accessor devices $A_1, \ldots, A_N$ to total access port A device-dependent data derived from the input, translating at the total access port A the device-dependent data into device-independent data, transmitting the independent data over the total access link from total access port A to total access port B, translating the device-independent data into device-dependent data appropriate to the M target devices $B_1, \ldots B_M$, and sending the device-dependent data to the M target devices $B_1, \ldots B_M$.

The data can also flow in the reverse direction in an analogous manner.

The method can provide a universal communication link between any kind of accessor device and any kind of target device. The accessor devices $A_1, \ldots, A_N$ could be any type of human interface device, for either input from a user or output to a user, such as a keyboard, a mouse, a video monitors a liquid-crystal display, an LED display, a speaker, a voice synthesizer, a speech recognition system, a remote control, a headband switch, an eye tracker, a printer, a personal data assistant, a sound generator, a Braille display, a tactile display, or a virtual reality display. The target devices $B_1, \ldots B_M$ could be any type of electronic or electrically controlled device that a human user might want to control, use, or otherwise interact or communicate with, such as a computer, a stereo, a TV, a VCR, an environment controller, an ATM, a vending machine, a telephone, a fax machine, an elevator control system, a pager, a copier, a microwave oven, an industrial controller, a telcom device, an appliance, a car, an airplane, or an information kiosk.

In one embodiment of the invention, a total access link is used to connect a desktop or laptop computer to a specialized input device including a speech recognition system and a sound and voice interface for facilitating speech input. In this embodiment the information link is a bi-directional infrared serial data link and the data is transmitted in packets using full error-handling, error-correction, handshaking, data compression, and data decompression. A universal data packet can be one of many different generic types: a keyboard packet, a mouse packet, a video packet, a target data packet, a control packet, and an accessor-to-accessor packet. Every packet, however, has a universal form: a header which defines the type of packet, a byte-count of the number of data bytes in the packet, a collection of data bytes, and a 2-byte cyclic redundancy check (CRC). Although there are different generic types of packets, the data contained in the packets has a user-functional representation rather than using arbitrary device codes to represent information, i.e. the data directly represents actions performed by the human user.

In another embodiment of the invention, a total access link is used to connect an ATM to a specialized input device including a speech synthesizer and speech recognition system. In this embodiment the information link includes a bi-directional infrared serial data link with both long-range and short-range modes, and a one-way radio frequency link. This embodiment helps a person to locate an ATM machine by sending a radio frequency wake-up call from the person to any ATM within close proximity.

BRIEF DESCRIPTION OF THE DRAWING FIGURES

DETAILED DESCRIPTION

Figure 1:
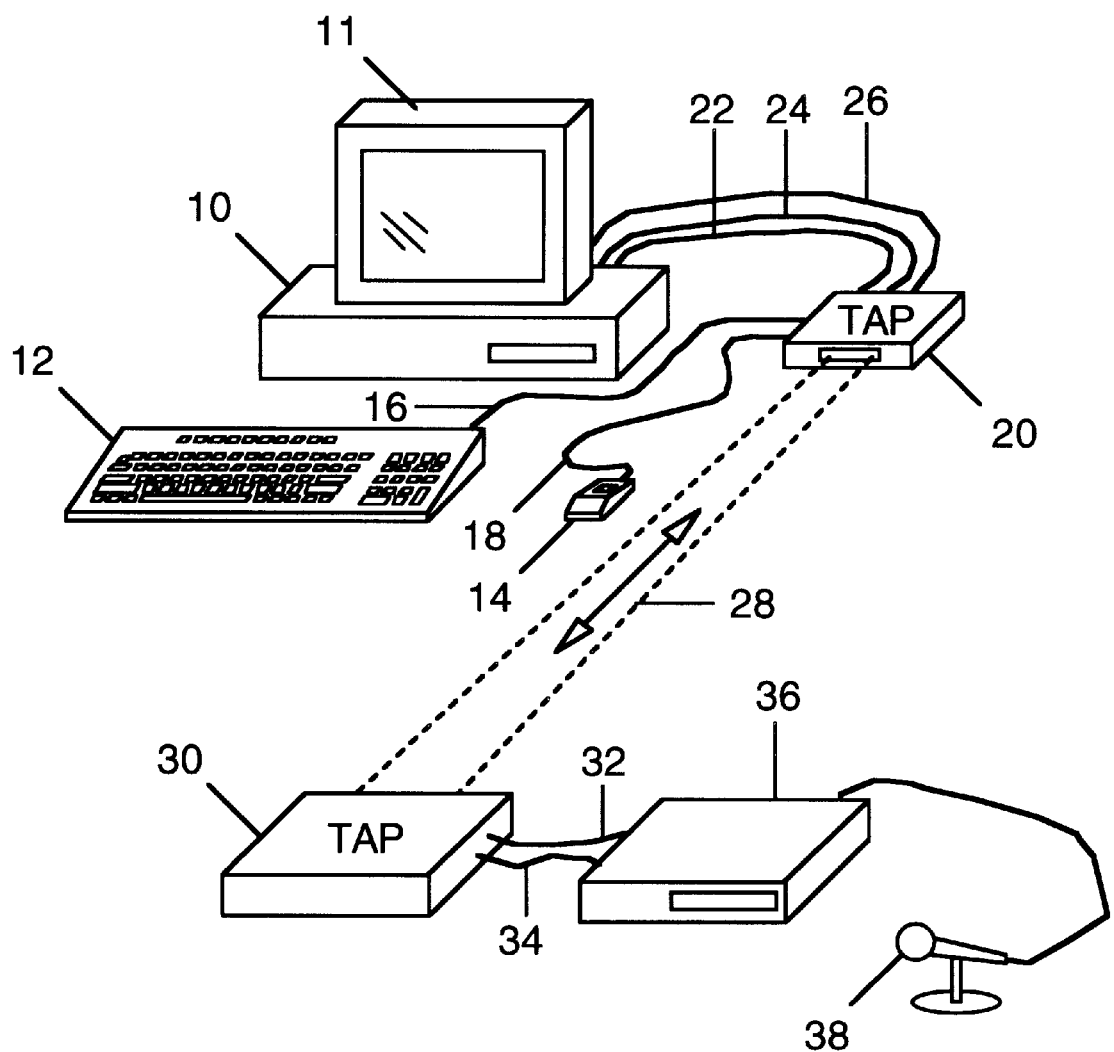
FIG. 1 is a perspective view of an embodiment of the invention as used to provide universal access to a personal desktop computer.

FIG. 1 shows a preferred embodiment in which the target device is a conventional personal computer 10. The computer hardware and software has not been modified or customized in any way. Also shown are a standard video monitor 11, a conventional keyboard 12 and a mouse 14. Rather than connecting directly to the computer, however, a keyboard cable 16 and a mouse cable 18 are connected to a target total access port (TAP) 20. An auxiliary keyboard cable 22 and an auxiliary mouse cable 24 connect the target TAP 20 to the computer 10. In addition, an auxiliary video cable 26 also connects the computer 10 to the target TAP 20. Computer 10 may be operated using conventional keyboard 12 and mouse 14, just as it is operated in the absence of TAP 20. In addition, TAP 20 provides additional avenues for accessing and operating computer 10.

Figure 2:
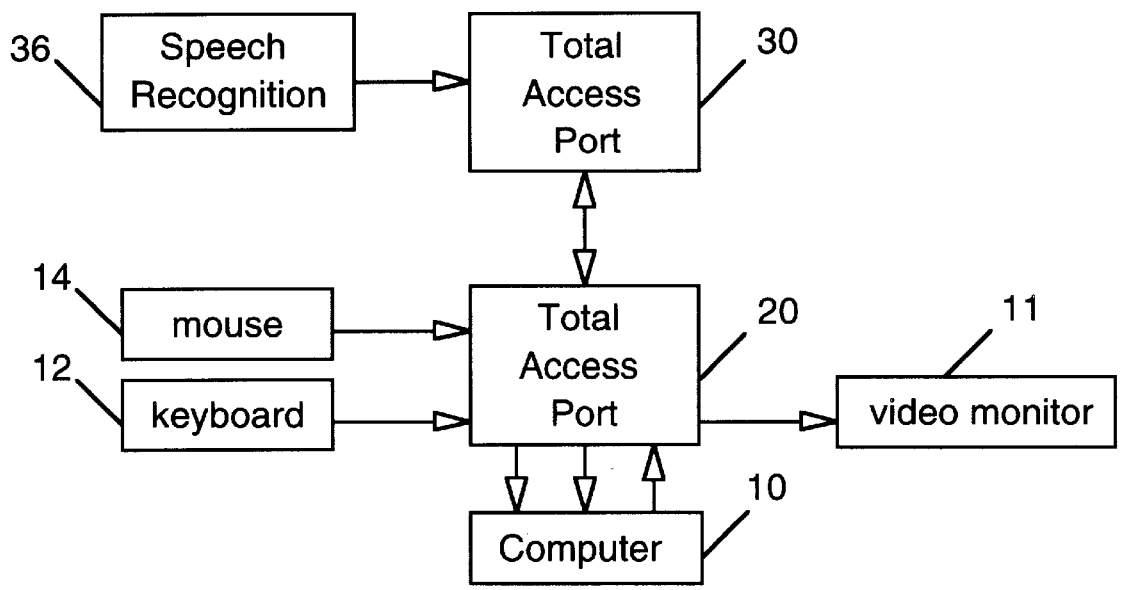
FIG. 2 is a schematic diagram showing the relationships of the main components shown in FIG. 1.

An infrared beam 28 carries signals between the target TAP 20 and an accessor TAP 30. An input cable 32 and an output cable 34 connect the accessor TAP 30 to a speech recognition system 36. Connected to this system is a microphone 38. A block diagram of this embodiment is shown in FIG. 2.

The personal computer 10 can be any of the many such desktop and laptop computers widely used today. The speech recognition system 36 may include, for example, an ACPA card (not shown) and a 486 computer (not shown) with 12 MB RAM and a 40 MB hard disk (not shown). The microphone 38 is a high sensitivity microphone with noise cancellation properties. The target TAP 20 and the accessor TAP 30 include conventional infrared communication technology, microprocessors, and memory, as described below in relation to FIG. 9.

When the computer is being accessed in the conventional manner, input signals from the keyboard 12 and mouse 14 pass through the keyboard cable 16 and mouse cable 18, respectively, and into the target TAP 20. These input signals are sent to the personal computer 10 through the auxiliary keyboard cable 22 and the auxiliary mouse cable 24 with minimal modification in the target TAP 20. The presence of the target TAP 20 is therefore transparent to the normal interaction of the personal computer 10 with its keyboard 12 and mouse 14. Moreover, it should be emphasized that no hardware modifications are made to the standard keyboard or mouse devices.

In addition to sending input signals from the keyboard 12 and mouse 14 to the computer 10, the target TAP 20 can also send input signals derived from information received from the accessor TAP 30. When verbal commands detected by the microphone 38 enter the speech recognition system 36, they are translated into corresponding command signals which are sent to the accessor TAP 30 via input cable 32. The accessor TAP 30 converts the command signals into the appropriate universal data packets, as described below. These packets are then transmitted to the target TAP 20 via the infrared beam 28. The target TAP 20 then converts the universal data packets into appropriate device-specific keyboard and mouse signals, and sends these signals to the personal computer 10 via the auxiliary keyboard cable 22 and the auxiliary mouse cable 24.

The data packets sent from the accessor TAP 30 to the target TAP 20 are universal or device-independent. For the purposes of the present application, device-independent data is defined to be data whose format and coding is independent of the specific target and accessor device hardware representations of data. In addition, the packets represent information in a user-functional form. For the purposes of the present application, a user-functional representation of data is defined to be a representation of data in terms of actions that might be performed by a human user interacting with a human user interface device. To illustrate, consider the following examples. When the word "up" is spoken into the microphone 38, the speech recognition system sends device-dependent ASCII characters "up" to the accessor TAP 30, which is customized to interpret ASCII input from a speech recognition system. The accessor TAP 30 then creates a universal data packet containing a signal indicating a mouse movement upward. Such a data packet represents the user action of moving a generic pointing device upward, and is independent of any particular mouse and the hardware codes or signals it generates when moved upward. A special verbal command, such as "type", causes the accessor TAP 30 to convert characters it receives into universal data packets containing keystroke commands rather than mouse movements. For example, when the phrase "dear john colon how are you question mark" is spoken into the microphone, the device-dependent ASCII string "Dear John: How are you?" is generated by the speech recognition system and sent to the accessor TAP 30. The accessor TAP will then convert this device-dependent ASCII string into device-independent keyboard data packets containing generic keystroke commands to type this phrase. A special verbal command, such as "move mouse", causes the accessor TAP 30 to again convert characters into data packets for mouse movements.

The keystroke commands in the data packets are user-functional in the sense that they represent the actions of the user involved in pressing a combination of keys rather than representing arbitrary device-dependent hardware codes corresponding to various combinations of keys. For example, rather than representing the information as a sequence of device-dependent ASCII codes corresponding to the characters D, e, a, r, space, J, o, h, n, user-functional codes representing the actual keystrokes are used: shift down, d down, d up, shift up, e down, e up, a down, a up, r down, r up, space down, space up, shift down, j down, j up, shift up, o down o up, h down, h up, n down , n up. Which key is pressed or released is represented not by an arbitrary character code, but by the spatial position on the keyboard where the user has pressed or released a key. The information is thus encoded in a form that is representative of the actions the user performs to create the characters. ASCII code, in contrast, is a device-dependent code representative of characters themselves, irrespective of user actions used to press keys. The user-functional representation of data mirrors the actions of the human being rather than the computer's internal hardware codes. Representing data in terms of user actions has the advantage that it is explicit and provides for easy and intuitive adaptation of accessor-target communication without requiring the human user to have any knowledge of device-dependent codes that are hidden from the user.

Figure 4:
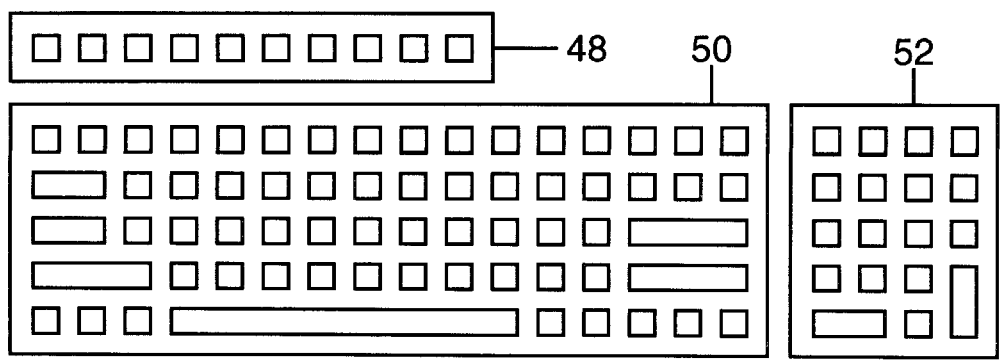
FIG. 4 is a schematic diagram of a conventional keyboard indicating the grouping of the keys according to the invention.

As shown in FIG. 4, the keys on computer keyboards naturally fall into distinct functional groups: the group of function keys 48, the group of standard keys 50, and the group of keys in a numeric keypad 52. The user-functional representation of a keystroke includes a first byte to specify the group of keys and a second byte to specify the particular key in the group. In addition, the first byte has a bit reserved which indicates whether the key is being pressed or released. For example, if the second function key is released, a data byte pair will contain a first byte indicating a key was released and specifying the function key group, and a second byte indicating the second key in the group. It will be appreciated that other encoding techniques may also be used to represent data in a user-functional form. For example, the first byte may reserve two bits to indicate whether a key is pressed or released. The first bit indicates a pressed key and the second bit indicates a released key. Both bits can be used to indicate that the key was pressed and released during an interval when no other key was pressed or released. This form of representation has the advantage that it is a more compact form in many cases.

Figure 3:
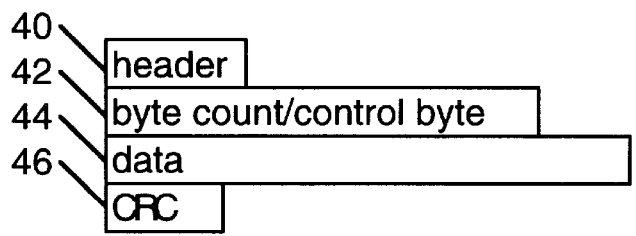
FIG. 3 is a diagram showing the structure of a data packet according to an embodiment of the invention.

FIG. 3 shows a general form for universal data packets. Each packet begins with a header 40 which identifies the type of packet, such as a mouse packet or keyboard packet. Then follows a byte count or control byte 42, a sequence of data bytes 44, and a two-byte cyclic redundancy check (CRC) 46. A keyboard packet, for example, contains one header byte which uniquely identifies it as a keyboard packet, one control byte whose least significant six bits indicate how many bytes are in the rest of the packet, a sequence of data byte pairs, and two CRC bytes.

Referring now back to FIG. 1, when a universal data packet arrives at the target TAP 20, its device-independent data is decoded and appropriate device-dependent signals are sent to the personal computer 10. For example, when the target TAP 20 receives a keyboard packet indicating that the second key in the function key group is depressed, it translates this information into the device-dependent ASCII code which this particular computer uses for the second function key and sends it to the computer 10. The target TAP, therefore, is customized with a knowledge of the device-dependent codes and formats used by the target device. Since the target TAP 20 can be produced with a memory that contains the codes for all common keyboards, one TAP could be sold to operate with many computers. Moreover, if new computers are produced with different key codes, the codes can be entered into the memory of existing TAPs and newly produced TAPs.

With this universal method of communication, an individual with a customized input device, such as the speech synthesizer 36, can change computer systems as easily as anyone else. If the individual changes to a new type of computer, the accessor TAP 30 and the target TAP 20 briefly converse to learn about each other. Special control packets facilitate this initial dialogue and also handle other matters of protocol. This initial dialogue might include, for example, a request by the accessor TAP 30 for information from the target TAP 20 about the target system's user interface resources. The target TAP 20 then responds with a description of the spatial layout of the standard keyboard and the various types of mouse control signals expected by the target system which it is configured to serve. Note that this resource information does not contain ASCII or other codes that depend on the target device electronics. Instead, the resource information contains a user-functional description of the manner in which the target device is capable of communicating with users. Similarly, the accessor TAP also may provide to the target TAP requested resource information containing a user-functional description of the manner it which it is capable of communicating with users and/or the type of information it is capable of providing. For example, although the accessor devices may not include a keyboard, an accessor speech recognition system may be capable of providing equivalent information, in which case the accessor TAP would indicate that it is capable of providing keyboard information. From the resource information obtained in this the dialog, the accessor and target TAPs construct legends or tables containing device-independent link data and their corresponding user-functional descriptions. For example, the keyboard legend might contain the name of a key on the keyboard as well as its spatial location on the keyboard together with a device-independent representation that is transmitted over the link. In addition, the legends contain device-dependent codes or information corresponding to these device-independent codes and user-functional descriptions. The legend in the accessor TAP allows it to translate between the device-independent keyboard data transmitted over the link and the device-dependent data used by the accessor to create alphanumeric strings. Similarly, the target TAP allows it to translate between the device-independent keyboard data received over the link and the device-dependent ASCII codes (or other key codes) understood by the computer.

Figure 9:
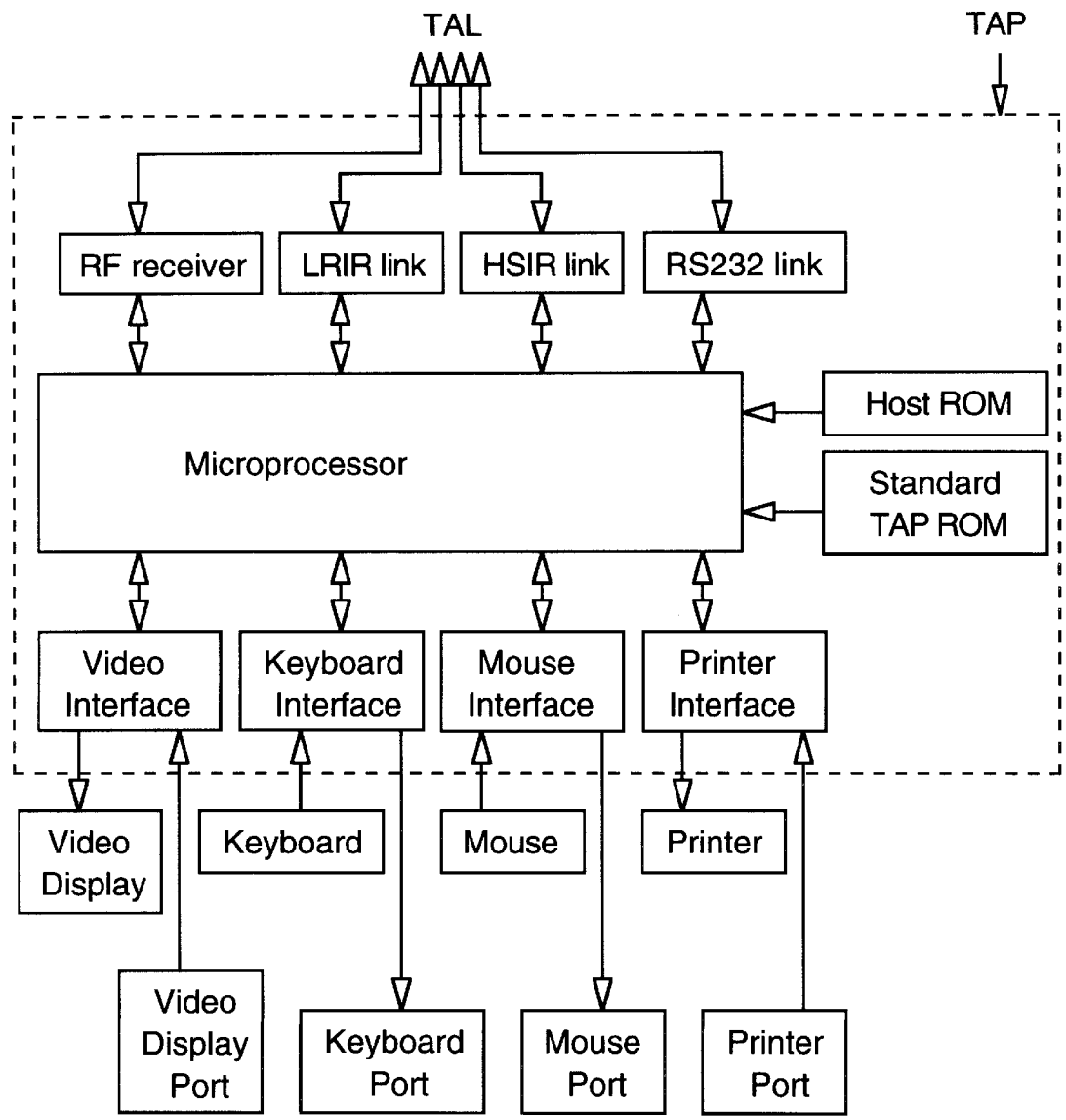
FIG. 9 is a block diagram of a total access port adapted for use with a personal computer, in accordance with the present invention.

FIG. 9 is a block diagram showing the internal details of a target TAP used in this embodiment. A standard TAP ROM contains instruction code and device-specific data tables that enable the TAP to operate with many common desktop and laptop computers. In addition, a customized target ROM can be included to allow the TAP to function with other less common computers and devices. A microprocessor in the TAP executes the instruction code for translating between universal data packets and the device-dependent codes specific to the target device. A standard TAP can be equipped with a communications interface for supporting both a long-range infrared (LRIR) and short-range high-speed infrared (HSIR) link, as well as an RS-232 link and an RF link. These links provide a standard TAP with a variety of communication modes for various purposes as they may arise (such as in the alternate embodiment described below). The TAP also has device interfaces which allow it to communicate with the computer and its conventional input and output devices.

The accessor TAP 30 in the embodiment of FIG. 1 is similar to the target TAP described in relation to FIG. 9. The ROM in the accessor TAP, however, stores codes and information specific to the accessor devices. This information enables the TAP to translate between universal data packets and the device-dependent data appropriate to the accessor devices. In addition, the accessor TAP may also include a sound and voice interface which is an intelligent layer of software that creates an intelligent bridge between voice/sound input/output and applications not originally designed to function with voice/sound input/output. The sound and voice interface instruction codes may be integrated into the TAP ROM and executed by the TAP microprocessor, or a dedicated microprocessor and ROM may be inserted in the data stream between the device and the TAP to perform the interface functions. The interface enables the user to create, edit, and initiate voice macros, and provides protection for authors of specialized voice macros by encrypting and registering the macros. It provides context-sensitive preemptive help by monitoring the system and analyzing how the user works, and provides user-initiated help to assist the user in using the accessor. The interface also warns the user against making irrecoverable errors. Since the interface is integrated into the speech recognition system 36 or accessor TAP 30 rather than the target TAP 20 or the computer 10, it may be customized in various ways to suit the particular needs and preferences of the user without in any way imposing limitations on target devices. If a sound and voice interface is included in the embodiment to provide the user with audio help, a speaker and sound/speech synthesizer would be included as described in the following embodiment.

Figure 5:
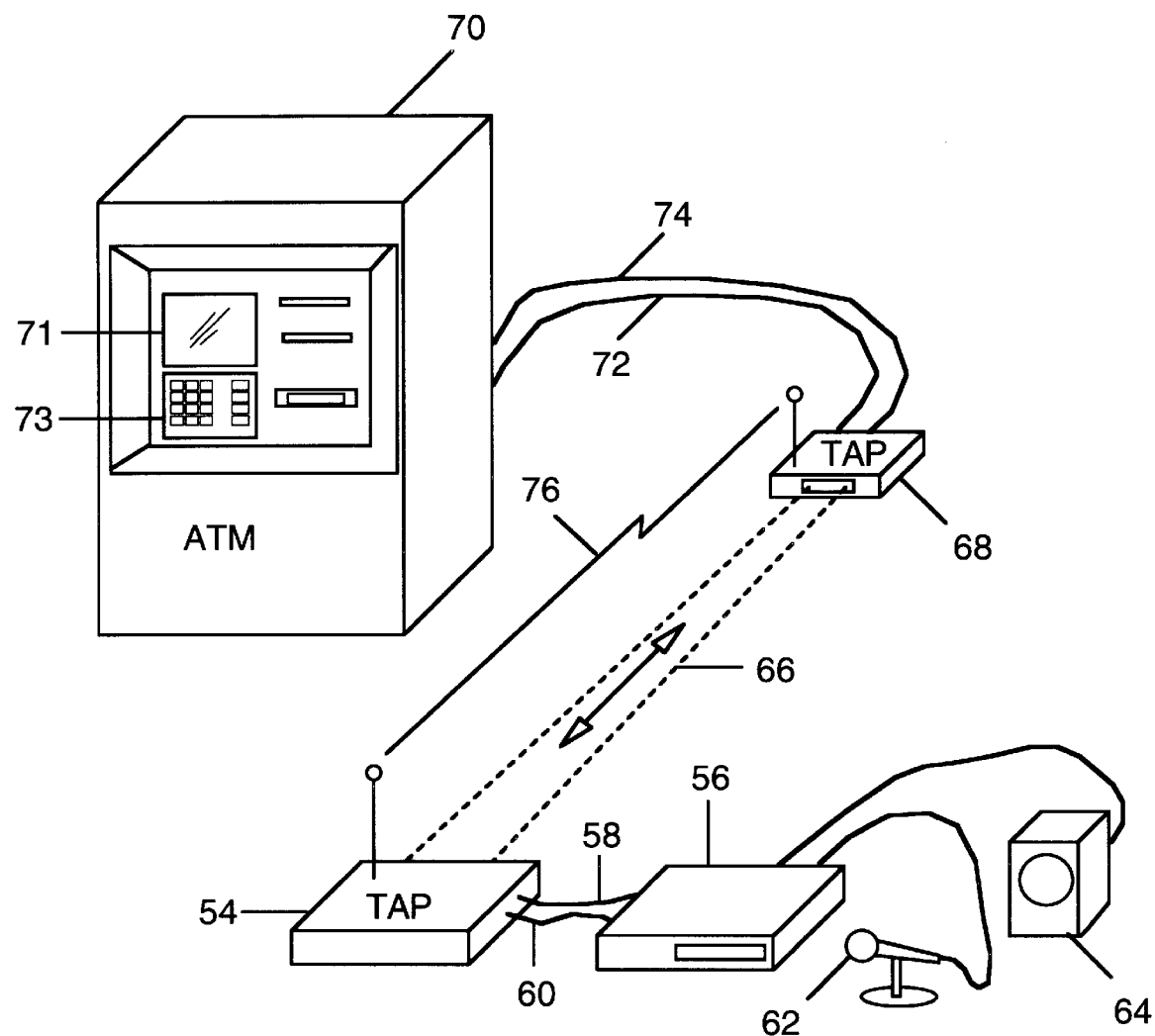
FIG. 5 is a perspective view of an embodiment of the invention used to provide universal access an automatic teller machine.
Figure 6:
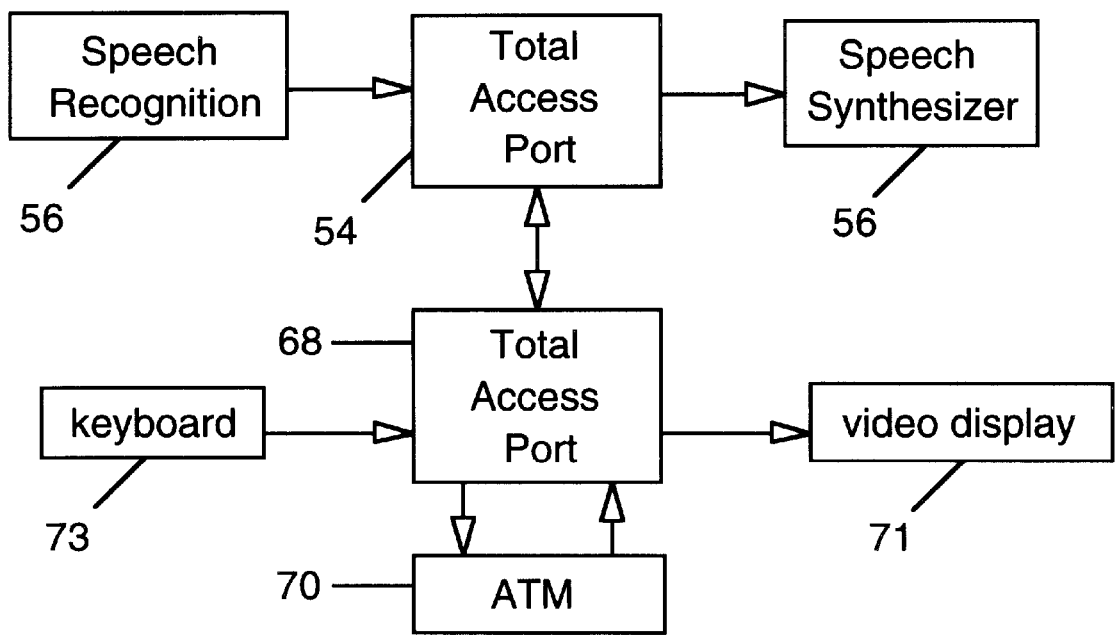
FIG. 6 is a schematic diagram showing the relationships of the main components shown in FIG. 5.

FIG. 5 shows an alternate embodiment of the invention. Accessor TAP 54 is connected to a speech recognition and synthesis system 56 via an input cable 58 and output cable 60. In addition to accepting speech input from a microphone 62, the speech recognition and synthesis system 56 also includes a speech synthesizer which sends its output to a speaker 64. Under normal circumstances, the accessor TAP 54 communicates via a high-speed infrared information link 66 with a target TAP 68. Rather than being connected to a personal computer, the target TAP 68 is connected via an input cable 72 and an output cable 74 to a standard automatic teller machine (ATM) 70 having a video display 71 and a keyboard 73. A block diagram of this configuration is shown in FIG. 6.

Figure 7:
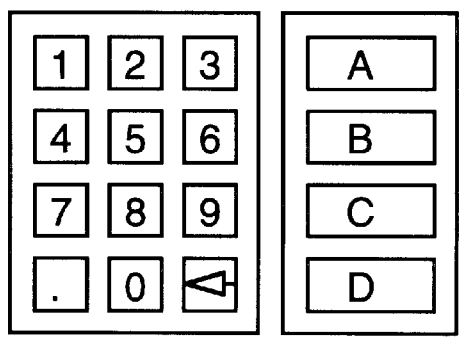
FIG. 7 is a schematic diagram of an ATM keyboard indicating the grouping of keys according to the invention.
Figure 8:
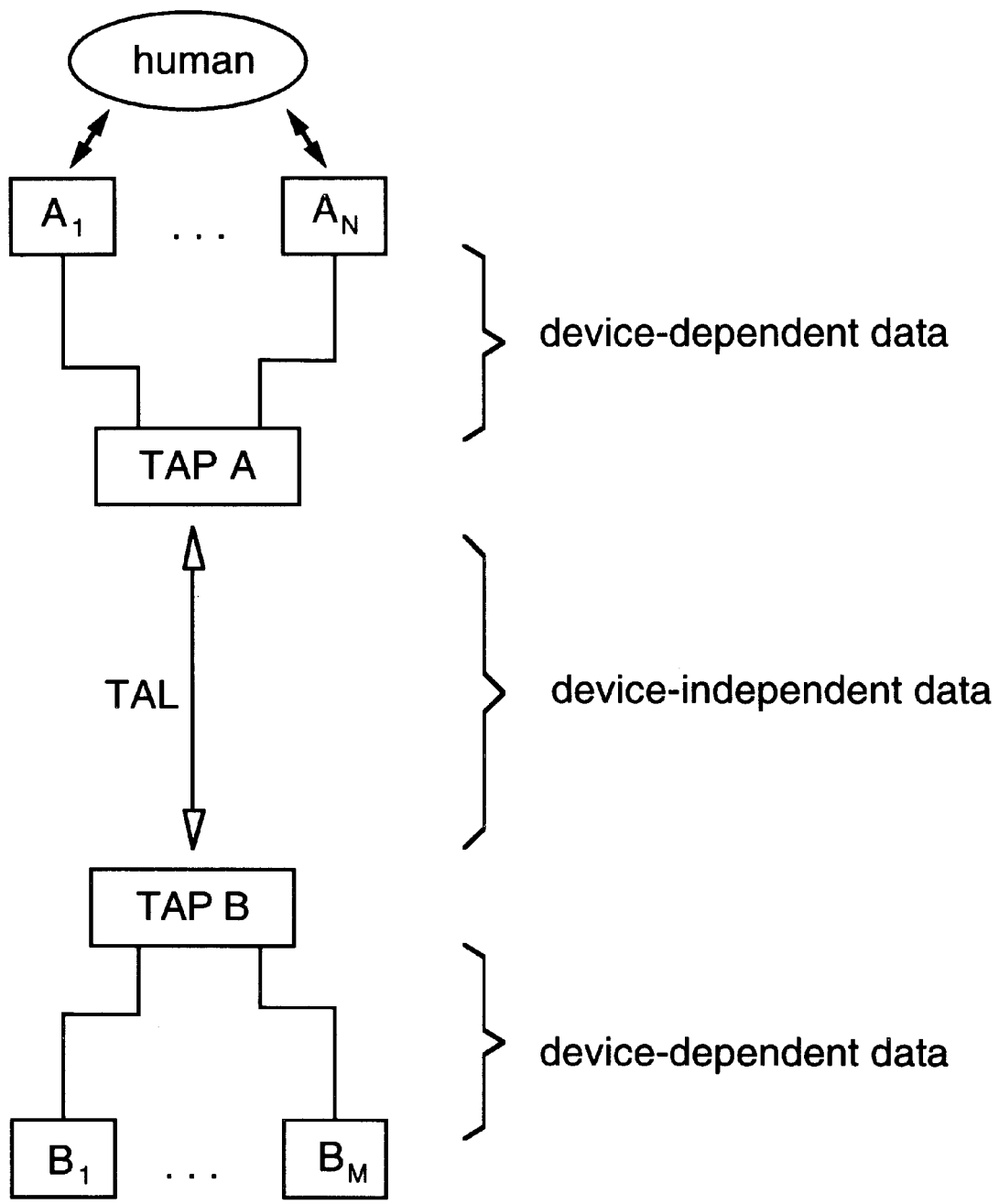
FIG. 8 is a schematic diagram of a total access system in its most general terms.

The speech recognition and synthesis system 56 receives voice commands which the accessor TAP 54 converts into generic keyboard packets and transmits over the infrared information link 66 to the target TAP 68. The target TAP 68 then converts these packets into appropriately coded device-dependent keyboard signals which are then sent to the ATM 70 via the input cable 72. The layout of keyboard 73 is shown in FIG. 7 with the two groups of keys indicated.

FIG. 5 shows the output cable 74 carrying a video signal from the ATM 70 to the target TAP 68 which uses standard optical character recognition (OCR) technology to convert the video signal into encoded text. The target TAP 68 then creates a generic packet containing the text and transmits it to the accessor TAP 54 via the infrared link 66. The accessor TAP 54 passes the text on to the speech recognition and synthesis system 56 which generates audible speech through the speaker 64.

With this method for universal communication, an individual with a disability can easily access any type of ATM equipped with a TAP. Moreover, other electronic devices such as microwave ovens, fax machines, answering machines, and telephones can also be easily accessed using the same accessor TAP, provided the electronic devices are equipped with TAPs.

Figure 10:
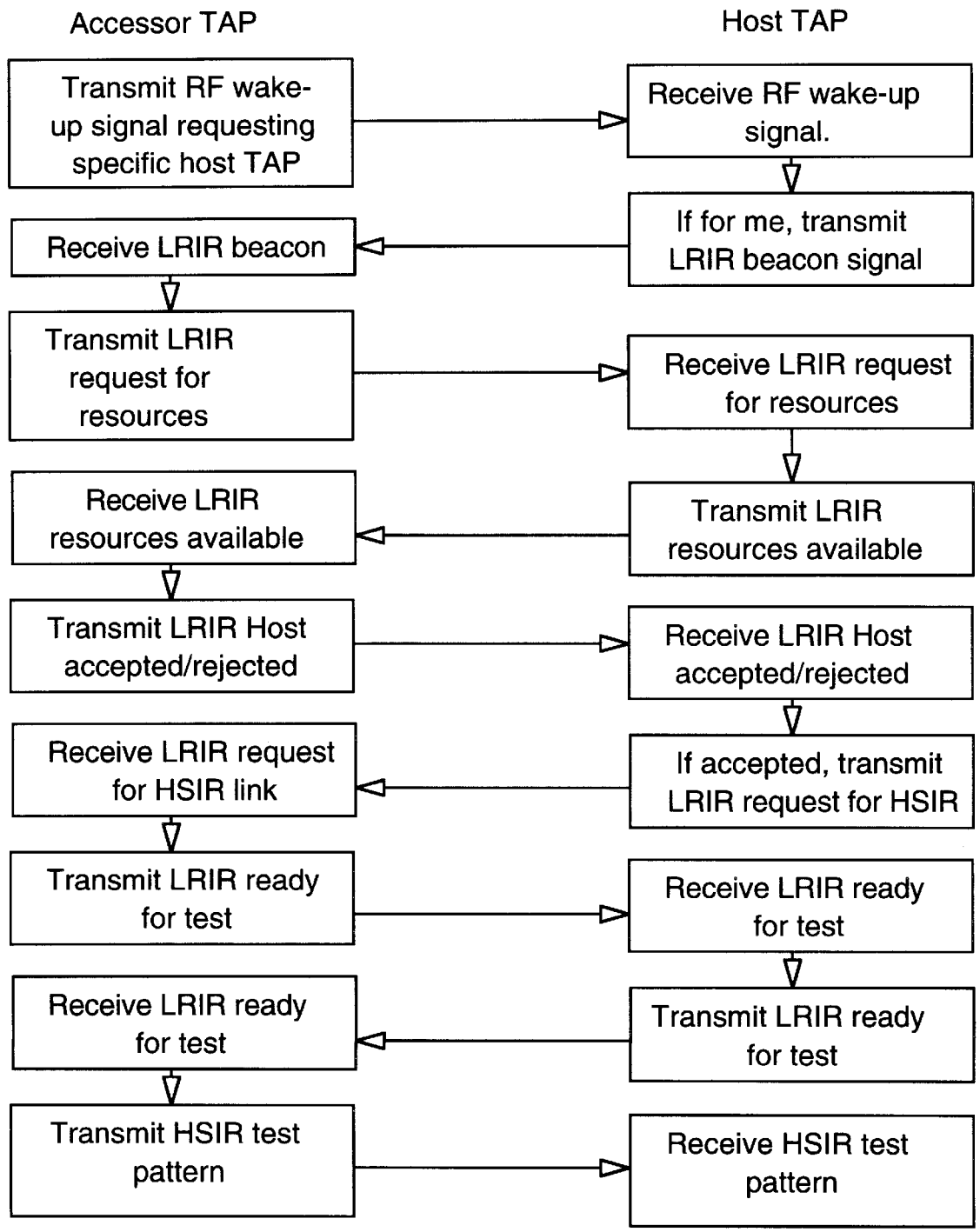
FIG. 10 is a flow diagram showing the exchange between an accessor total access port (TAP) and a target device TAP that helps the person using the accessor TAP to locate the target device TAP.

A person who is blind or visually impaired may have difficulty locating a desired electronic device, such as an ATM. In this case, target TAP 68 can engage in a dialog with accessor TAP 54 to assist the person in establishing a link with the ATM. A simple one-way radio frequency (RF) link 76, such as used in common car alarm systems to enable and disable the alarm at a distance, is used to initiate the dialog. If TAP 68 receives such an RF wake-up call, it responds by sending a long-range IR (LRIR) beacon signal. Since IR links are directional, this beacon signal allows the accessor TAP 54 to determine the relative direction of the ATM TAP 68 Once a bi-directional LRIR link is established, the accessor TAP 54 sends the ATM TAP 68 a request for a description of its resources. If the resources are satisfactory, the TAPs attempt to establish a high speed IR (HSIR) link by transmitting a test pattern. If the test fails, the TAPs may have to be moved closer together or aligned more precisely. In this manner, the TAPs can assist in establishing the TAL between electronic devices. The flow diagram shown in FIG. 10 shows this procedure in more detail.

Although the above descriptions contain many specificities, these should not be construed as limitations on the scope of the invention, but rather as an illustration of particular embodiments thereof. Many other variations are possible. For example, the information link between total access ports need not be an infrared link. It could also be a radio link, fiber optic link, electronic cable link, modem link, computer network link, or other type of communications link. For each type of link, suitable forms of data compression, error correction, and handshaking may be used.

Although the two examples illustrate the method with a personal computer and an ATM, the method is designed specifically to enable easy access to any type of electronically controlled device. Many other common devices could be equipped with a TAP and accessed similarly. For example, it is obvious that the method may be used with a telephone, an answering machine, a fax machine, a stereo system, a VCR, a microwave oven, a TV, a video game, a copier, an environment controller, a vending machine, an elevator, a pager, a modem, an industrial controller, a telcom device, an appliance, a car, an airplane, an information kiosk, and a radio-controlled toy. In general, any device which is electronically operated or controlled can be equipped with a TAP and made universally accessible through this method.

Moreover, although the input devices and output devices illustrated are speech recognition and synthesis systems, the method is designed to allow many other customized or standard input and output devices to be used. For example, in addition to a speech recognition and synthesis system, the method may be used with a standard keyboard, a mouse, a track-ball, a joy-stick, a video monitor, a liquid-crystal display, an LED display, a speaker, a remote control, a headband switch, a printer, a personal data assistant, a sound generator, a Braille display, a tactile display, a virtual reality display, or any customized input device designed to suit the needs of a particular individual.

Although the method illustrates communication between a target device and accessor devices having human input, it is obvious that this method can also be used to link two target devices or to link accessor devices associated with two people. With standard protocol techniques, the method can also be used to link more than two devices together simultaneously. In particular, it will be appreciated that any number of accessor and target devices may be networked together using various well known digital computer networking techniques in conjunction with accessor and target TAPs. Appropriate protocols and techniques may be used to provide enhanced performance of such networked accessor and target devices. For example, networked accessor devices can be used together to permit coordinated input, such as a headband switch used as a keyboard shift key to simplify typing for a user who is able to press only one key at a time. In another example, a networked information server can contain a centralized database of device information for many accessors and target devices, storing accessor and/or target legend information for convenient use at future times. An accessor TAP, which may have limited memory resources, then does not have the burden of storing legend information for the entire network of target devices. Instead, that information is available each time the user connects to the network via the accessor TAP.

Clearly, there are many possible variations in the particular user-functional representation used for the universal data packets. For example, keys may be grouped in different ways or given x-y coordinate representation. There also may be variations in the particular form of the universal data packets The length of each portion of the packet may be varied, as well as the order. Moreover, there may be many distinct types of packets used to represent different types of user-functional activity or other data. For example, in addition to a keyboard packet, a universal packet may be a mouse packet, a video packet, a target data packet, a control packet, and an accessor-to-accessor packet. Other packet types can be included as required.

It will also be appreciated that embodiments of the present invention may include various tools and techniques to further assist and facilitate the user of electronic devices. In particular, many customizations of the accessor devices and accessor TAP may improve the efficiency and ease with which a user interacts with the accessor devices. For example, accessors and/or TAPs can provide the capability to define and execute macros in order to simplify the performance of routine sequences of actions. All such customizations are localized in the accessor and/or accessor TAP and are transparent to the target device. The invention, therefore, takes advantage of these types of personal access customizations while not limiting the target device, or requiring its modification or customization in any way. Moreover, the accessor customizations are portable, allowing the user to take advantage of them when using other target devices.

In view of the above variations and other variations that will be appreciated by those skilled in the art, the scope of the invention should be determined not by the embodiments illustrated, but by the appended claims and their legal equivalents.

What is claimed is:

1. A method of communication with a target device using a communication system including an accessor total access port, an accessor device connected to said accessor total access port, a target total access port connected to said target device which is an unmodified electronic device, and a total access link between the accessor total access port and the target total access port, the method comprising:

converting, by said accessor device, user actions into data of a device-dependent form specific to said accessor device, said data of the device-dependent form specific to the accessor device representing control of the target device, wherein the accessor device is a human user interface device that accepts intentions from the user in whatever form the user expresses them;

sending the data of the device-dependent form specific to the accessor device from the accessor device to the accessor total access port;

translating, by said accessor total access port, the data sent from the accessor device of the device-dependent form specific to the accessor device into data of a device-independent form containing a user-functional representation of the data sent from the accessor device;

transmitting the translated data of the device-independent form over the total access link from the accessor total access port to the target total access port;

translating, by said target total access port, the data sent from the accessor total access port of the device-independent form into data of a device-dependent form specific to the target device; and sending the data of the device-dependent form specific to the target device from the target total access port to the target device.

2. The method of claim 1 wherein the total access link comprises an information link chosen from the group including at least an infrared link, an electronic cable lin, a computer network link, a fiber optic link, and a radio frequency link.

3. The method of claim 1 wherein the total access link comprises a bi-directional serial transmission link with error-handling, error-correction, handshaking, data packing, and data unpacking.

4. The method of claim 1 wherein the transmitting comprises creating a generic data packet chosen from the group including at least a keyboard packet, a mouse packet, a video packet, a target data packet, a control packet, and an accessor-to-accessor packet.

5. The method of claim 1 wherein the accessor device is selected from the group including at least a keyboard, a mouse, a track-ball, a joy-stick, a video monitor, a liquid-crystal display, an LED display, a speaker, a voice synthesizer, a speech recognition system, a remote control, a headband switch, a printer, sound generator, a Braille display, a tactile display, and a virtual reality display.

6. A method of of communication with a target device using a communication system including an accessor total access port, an accessor device connected to said accessor total access port, a target total access port connected to said target device which is an unmodified electronic device, and a total access link between the accessor total access port and the target total access port, the method comprising:

converting user actions into electronic data of a device-dependent form specific to the accessor device using the accessor device, wherein the accessor device is a human user interface device;

sending the electronic data of the device-dependent form specific to the accesor device from the accessor device to the accessor total access port;

translating the electronic data of the device-dependent form specific to the accesor device sent from the accessor device from the device-dependent form specific to the accessor device into a device-independent form containing a user-functional representation of the electronic data sent from the accessor device;

transmitting the translated electronic data of the device-independent form over the total access link from the accessor total access port to the target total access port;

translating the transmitted electronic data of the device-independent form into a device-dependent form specific to the target device; and sending the translated electronic data of the device-dependent form specific to the target device from the target total access port to the target device, wherein the accessor device comprises:
a speech recognition and synthesis system, and
wherein the accessor total access port comprises:
a sound and voice interface for facilitating the use of speech input.

7. The method of claim 1 wherein
the target device comprises a personal computer, and
the target total access port comprises a ROM containing communication resource information about the personal computer.

8. A method of communication with a target device using a communication system comprising an accessor total access port, an accessor device connected to said accessor total access port, a target total access port connected to said target device which is an unmodified electronic device, and a total access link between the accessor total access port and the target total access port, the method comprising:

converting user actions into electronic data of the device-dependent form specific to the accesor device using the accessor device, wherein the accessor device is a human user interface device;

sending the electronic data of the device-dependent form specific to the accesor device from the accessor device to the accessor total access port;

translating the electronic data of the device-dependent form specific to the accesor device sent from the accessor device from the device-dependent form specific to the accessor device into a device-independent form containing a user-functional representation of the electronic data sent from the accessor device;

transmitting the translated electronic data of the device-independent form over the total access link from the accessor total access port to the target total access port;

translating the transmitted electronic data of the device-independent form into a device-dependent form specific to the target device;

sending the translated electronic data of the device-dependent form specific to the target device from the target total access port to the target device; and sending a radio frequency wake-up call from the accessor total access port to the target total access port.

9. An accessor total access port in a system including an accessor device connected to the accessor total access port, a target device connected to a target total access port, said target device being an unmodified device, and a total access line between the accessor total access port and the target total access port, the accessor total access port comprising:

a microprocessor;

wherein said accessor device converts user actions into data of a device-dependent form specific to said accessor device, said data of the device-dependent form specific to the accessor device representing control of the target device, wherein the accessor device is a human user interface device that accepts intentions from the user in whatever form the user expresses them;

an accessor device interface between the microprocessor and the accessor device for communicating device-dependent electronic data specific to the accessor device between the accessor device and the microprocessor;

a memory containing data about the accessor device and instruction code including instructions for the microprocessor to translate the data of the device-dependent form specific to the accessor device from the accessor device into data of a device-independent form containing a user-functional representation of the data from the accessor device; and a communications interface between the microprocessor and the total access link for transmitting the data of the device-independent form over the total access link to the target total access port.

10. An accessor total access port in a system including an accessor device connected to the accessor total access port, a target device connected to a target total access port, and a total access link between the accessor total access port and the target total access port, the accessor total access port comprising:

a microprocessor, an accessor device interface between the microprocessor and the accessor device for communicating device-dependent electronic data between the accessor device and the microprocessor;

a memory containing data about the accessor device and instruction code including instructions for the microprocessor to translate the device-dependent electronic data from the accessor device into device-independent data containing a user-functional representation of the electronic data from the accessor device, wherein the data about the accessor device includes device-dependent accessor data, device-independent link data, and user-functional descriptions; and a communications interface between the microprocessor and the total access link for transmitting the device-independent data over the total access link to the target total access port, wherein the communications interface comprises an infrared transceiver.

11. The total access port of claim 10 wherein the infrared transceiver transmits the universal data packet with error-handling, error-correction, handshaking, data packing, and data unpacking.

12. An accessor total access port in a system including an accessor device connected to the accessor total access port, a target device connected to a target total access port, and a total access link between the accessor total access port and the target total access port, the accessor total access port comprising:

a microprocessor, an accessor device interface between the microprocessor and the accessor device for communicating device-dependent electronic data between the accessor device and the microprocessor;

a memory containing data about the accessor device and instruction code including instructions for the microprocessor to translate the device-dependent electronic data from the accessor device into device-independent data containing a user-functional representation of the electronic data from the accessor device, wherein the data about the accessor device includes device-dependent accessor data, device-independent link data, and user-functional descriptions; and a communications interface between the microprocessor and the total access link for transmitting the device-independent data over the total access link to the target total access port, wherein the microprocessor formats the device-independent data into a data packet chosen from the group including a keyboard packet, a mouse packet, a video packet, a target data packet, a control packet, and an accessor-to-accessor packet.

13. An accessor total access port in a system including an accessor device connected to the accessor total access port, a target device connected to a target total access port, and a total access link between the accessor total access port and the target total access port, the accessor total access port comprising:

a microprocessor, an accessor device interface between the microprocessor and the accessor device for communicating device-dependent electronic data between the accessor device and the microprocessor;

a memory containing data about the accessor device and instruction code including instructions for the microprocessor to translate the device-dependent electronic data from the accessor device into device-independent data containing a user-functional representation of the electronic data from the accessor device, wherein the data about the accessor device includes device-dependent accessor data, device-independent link data, and user-functional descriptions; and a communications interface between the microprocessor and the total access link for transmitting the device-independent data over the total access link to the target total access port, wherein the accessor device comprises a speech recognition and synthesis system and the total access port comprises a sound and a voice interface for facilitating the use of speech input.

14. A system for interfacing a human user with an electronic device, the system comprising:

an accessor device in terfaced directly with the user, wherein said accessor device converts user actions into data of a device-d ep endent form specific to said accessor device, said data of the device-dependent form specific to the accessor device representing control of the electronic device, wherein the accessor device is a human user int erface device that accepts intentions from the user in whatever form the user expresses them;

a first microprocessor connected to the accessor device and programmed to translate between data of the device-dependent form specific to the accessor device and data of a device-independent form containing a user-functional representation that represents interactions of the user and the accessor device;

a second microprocessor connected to the electronic device and programmed to translate between the data of the device-independent form and data of a device-dependent form specific to the electronic device; and a communication link connecting the first and second microprocessors, wherein universal data packets are transmitted over the communication link between the first microprocessor and the second microprocessor each universal data packet including at least data of the device-independent form.

15. A method for interfacing a human user with an electronic device, the method comprising:

receiving input signals from an input/output device customized to the human user, wherein said inut/output device accepts intentions from the user in whatever form the user expresses them and converts the user intentions into device-dependent data specific to the input/output device;

translating, by a first microprocessor, the input signals into device-independent data containing a user-functional representation representing user intentions;

transmitting the device-independent data over a communications link from the first microprocessor to a second microprocessor;

translating, by the second microprocessor, the device-independent data into device-dependent data specific to the electronic device; and sending the device-dependent data specific to the electronic device to the electronic device.

16. The method of claim 15 further comprising transmitting a description of input/output device resources over the communications link.

* * * * *